United States Patent
Li et al.

(10) Patent No.: US 10,015,777 B2
(45) Date of Patent: Jul. 3, 2018

(54) METHOD AND APPARATUS FOR ALLOCATING SPECTRUM

(75) Inventors: Yan Li, Shenzhen (CN); Feng Li, Shenzhen (CN); Nan Zhao, Shenzhen (CN); Dong Zhou, Shenzhen (CN); Kaibo Tian, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 653 days.

(21) Appl. No.: 13/814,797

(22) PCT Filed: Nov. 17, 2010

(86) PCT No.: PCT/CN2010/078838
§ 371 (c)(1),
(2), (4) Date: Feb. 7, 2013

(87) PCT Pub. No.: WO2012/022079
PCT Pub. Date: Feb. 23, 2012

(65) Prior Publication Data
US 2013/0137445 A1    May 30, 2013

(30) Foreign Application Priority Data
Aug. 18, 2010   (CN) .......................... 2010 1 0259294

(51) Int. Cl.
*H04W 72/04*    (2009.01)
*H04W 16/02*    (2009.01)
(Continued)

(52) U.S. Cl.
CPC ........... *H04W 72/04* (2013.01); *H04W 16/02* (2013.01); *H04W 16/14* (2013.01)

(58) Field of Classification Search
CPC ... H04W 16/14; H04W 72/04; H04W 76/023; H04W 24/02; H04W 72/082;
(Continued)

(56) References Cited

U.S. PATENT DOCUMENTS 6,052,600 A    4/2000  Fette
7,602,792 B2   10/2009 Gray
(Continued)

FOREIGN PATENT DOCUMENTS

CN          1914944 A    2/2007
CN        101146343 A    3/2008
(Continued)

OTHER PUBLICATIONS

International Search Report in international application No. PCT/CN2010/078838, dated May 26, 2011.
(Continued)

*Primary Examiner* — Natasha W Cosme
(74) *Attorney, Agent, or Firm* — Oppedahl Patent Law Firm LLC

(57) ABSTRACT

A method and an apparatus for allocating spectrums are provided in the disclosure. The method includes: reconfigurable spectrums for a target group domain are calculated, wherein said reconfigurable spectrums contain one or more of a dedicated spectrum, a reusable spectrum and a loanable spectrum; during the system reconfiguration, spectrums are allocated to cells of the target group domain in a non-overlap region after spectrums are allocated to cells of the target group domain in an overlap region according to the reconfigurable spectrums. By use of the disclosure, the spectrum allocation can be implemented during the system reconfiguration, and interference can be effectively suppressed.

9 Claims, 3 Drawing Sheets

(51) Int. Cl.
*H04W 16/04* (2009.01)
*H04W 16/14* (2009.01)

(58) Field of Classification Search
CPC ..... H04W 72/00; H04W 84/18; H04W 48/16; H04W 64/00; H04W 72/042; H04W 76/02; H04W 88/06; H04W 8/005; H04W 16/10; H04W 24/08; H04W 24/10; H04W 36/08; H04W 4/02
USPC .............................................. 455/450, 452.2
See application file for complete search history.

(56) References Cited

U.S. PATENT DOCUMENTS

| | | | |
|---|---|---|---|
| 2003/0210680 A1* | 11/2003 | Rao et al. | 370/352 |
| 2005/0181797 A1 | 8/2005 | Piirainen | |
| 2005/0260997 A1* | 11/2005 | Korale et al. | 455/452.2 |
| 2008/0076440 A1* | 3/2008 | Guo et al. | 455/452.2 |
| 2009/0163237 A1 | 6/2009 | Abedi | |
| 2009/0191906 A1 | 7/2009 | Abedi | |
| 2010/0202305 A1* | 8/2010 | Wijting | H04W 16/14 370/252 |
| 2010/0311450 A1* | 12/2010 | Rinne et al. | 455/501 |
| 2011/0034177 A1 | 2/2011 | Oh et al. | |

FOREIGN PATENT DOCUMENTS

| | | |
|---|---|---|
| CN | 101784056 A | 7/2010 |
| CN | 101132363 B | 12/2010 |
| EP | 2073585 A1 | 6/2009 |
| EP | 2083594 A2 | 7/2009 |
| EP | 2187579 A1 | 5/2010 |
| WO | 2009040713 A2 | 4/2009 |
| WO | 2009101460 A1 | 8/2009 |
| WO | 2009123105 A1 | 10/2009 |

OTHER PUBLICATIONS

English Translation of the Written Opinion of the International Search Authority in international application No. PCT/CN2010/078838, dated May 26, 2011.
Supplementary European Search Report in European application No. 10856077.2, dated Mar. 30, 2017.

* cited by examiner

METHOD AND APPARATUS FOR ALLOCATING SPECTRUM

TECHNICAL FIELD

The disclosure relates to the field of wireless communications, and particularly to a method and an apparatus for allocating spectrums.

BACKGROUND

Spectrum resources are the fundamental media for communications and it is expected that the spectrum efficiency can be maximized due to limited spectrum resources.

Different wireless access technologies are developed to improve the spectrum efficiency. However, there is almost no spectrum and load switching among all wireless access technologies in existing communication networks, i.e. there are few mutual cooperative operations, which brings about the result that spectrum usage is relatively fixed and not flexible enough, and reduces the spectrum efficiency, e.g. the spectrum load of some wireless access technologies is relatively light while the spectrum load of some wireless access technologies is relatively heavy. Dynamic spectrum allocation cannot be realized because of the lack of interaction and cooperation among the access technologies.

Currently, a system reallocation technology is being discussed in the industry. The relocation refers to the adjustment of air interface parameters or configurations in wireless communication technologies, e.g. cell deletion or establishment, parameter adjustment of basebands or radio frequencies, and adjustment of return links etc. Spectrum allocation, which may be performed during system reconfiguration, needs to consider the problem of interference suppression. However, there is no method which can allocate spectrums during system reconfiguration and suppress interference effectively.

SUMMARY

In view of this, the main purpose of the disclosure is to provide a method and an apparatus for allocating spectrums, so as to allocate spectrums during system reconfiguration and suppress interference effectively.

To realize the purpose above, the technical proposal of the disclosure is implemented in the following way:

the disclosure provides a method for allocating spectrums and the method includes:

calculating reconfigurable spectrums for a target group domain, containing one or more of dedicated spectrums, reusable spectrums and loanable spectrums; and during system reconfiguration, allocating spectrums to cells of the target group domain in a non-overlap region after allocating spectrums to cells of the target group domain in an overlap region according to the reconfigurable spectrums.

The step of calculating reconfigurable spectrums for a target group domain may include:

calculating to obtain an occupation situation of all spectrums or part of expected spectrums in an adjacent group domain, comprising: usable spectrums of the adjacent group domain, and/or unloanable spectrums of the adjacent group domain; and computing to obtain the reconfigurable spectrums for the target group domain according to the occupation situation of all spectrums or part of the expected spectrums of the adjacent group domain.

The step of calculating to obtain an occupation situation of all spectrums or part of expected spectrums of the adjacent group domain may include:

notifying, by a base station or a high-level device of the adjacent group domain, the occupation situation of all spectrums or part of the expected spectrums of the adjacent group domain to a reconfigurable wireless communication system of the target group domain through a notification message; and/or, performing measurement, by a base station and/or a terminal of the target group domain to obtain the occupation situation of all spectrums or part of the expected spectrums of the adjacent group domain, and then reporting the occupation situation to the reconfigurable wireless communication system of the target group domain.

The step of computing to obtain the reconfigurable spectrums for the target group domain may include:

comparing usable spectrums of the target group domain with the usable spectrums of the adjacent group domain to obtain dedicated spectrums and shared spectrums of the target group domain;

deducting the unloanable spectrums of the adjacent group domain from the obtained shared spectrums of the target group domain to obtain the loanable spectrums of the target group domain; and in the unloanable spectrums of the adjacent group domain, using spectrums which can be used by the cells of the target group domain in the overlap region and causes no interference to cells of the adjacent group domain in the overlap region as the reusable spectrums of the target group domain.

The step of the allocating spectrums to cells of the target group domain in an overlap region may include:

when any one or more of the dedicated spectrum, the reusable spectrum and the loanable spectrum satisfy expected quality of service of the overlap region, allocating spectrums which satisfy the expected quality of service of the overlap region to the cells of the target group domain in the overlap region; otherwise, ending the spectrum allocation.

After allocating the spectrums to the cells of the target group domain in the overlap domain, the method may further include:

determining dedicated spectrums and/or loanable spectrums remaining in the reconfigurable spectrums after the spectrums are deducted from the reconfigurable spectrums to be allocated to the cells of the target group domain in the overlap region; and obtaining reusable spectrums used for spectrum allocation to the cells of the target group domain in the non-overlap region after deducting reusable spectrums allocated to the cells of the target group domain in the overlap region from the unloanable spectrums of the target group domain.

When the spectrum allocation to the cells of the target group domain in the non-overlap region is performed, the reconfigurable spectrums may include one or more of the remaining dedicated spectrums, the remaining loanable spectrums and the reusable spectrums used for the spectrum allocation to the cells of the target group domain in the non-overlap region The spectrum allocation to the cells of the target group domain in the non-overlap region may include:

when any one or more of the remaining dedicated spectrums, the remaining loanable spectrums and the reusable spectrums used for the spectrum allocation to the cells of the target group domain in the non-overlap region satisfy expected quality of service of the target group domain, allocating spectrums which satisfy the expected quality of service of the overlap region to the cells of the target group domain in the non-overlap region; otherwise, ending the spectrum allocation.

The disclosure further provides an apparatus for allocating spectrums. The apparatus includes:

a calculating module configured to calculate reconfigurable spectrums for a target group domain, including one or more of dedicated spectrums, reusable spectrums and loanable spectrums; and an allocating module configured to, during system reconfiguration, allocate spectrums to cells of the target group domain in a non-overlap region after allocating spectrums to cells of the target group domain in an overlap region according to the reconfigurable spectrums The calculating module may be further configured to, after allocating spectrums to the cells of the target group domain in the overlap domain, determine dedicated spectrums and/or loanable spectrums remaining in the reconfigurable spectrums except the spectrums allocated to the cell of the target group domain in the overlap region; and after deducting reusable spectrums allocated to the cells of the target group domain in the overlap region from unloanable spectrums of the target group domain, obtain reusable spectrums used for spectrum allocation to the cells of the target group domain in the non-overlap region;

correspondingly, when the calculating module allocates the spectrums to the cells of the target group domain in the non-overlap region, the reconfigurable spectrum comprises one or more of the remaining dedicated spectrums, the remaining loanable spectrums and the reusable spectrums used for the spectrum allocation to the cells of the target group domain in the non-overlap region.

The proposal of the disclosure for allocating spectrums is to allocates the spectrums during system reconfiguration, specifically, any one or more of the following spectrums is allocated to a cells of the target group domain in the overlap region first: dedicated spectrums, reusable spectrums and loanable spectrums which satisfy the expected quality of service of the overlap region; subsequently, any one or more of the following spectrums is allocated to the cells of the target group domain in the non-overlap region: dedicated spectrums, reusable spectrums and loanable spectrums which satisfy the expected quality of service of the target group domain. By doing so, spectrums can be allocated during the system reconfiguration.

Since the dedicated spectrum, the loanable spectrum and the reusable spectrum can ensure that a target cell and an adjacent cell are orthogonal in the frequencies, inter-cell interference can be avoided. In addition, for the overlap region, interference in the overlap region can be controlled stably when the dedicated spectrum and the reusable spectrum are used, thus reducing the probability of triggering reconfiguration. Since the interference caused by the target group domain to the adjacent group domain has been maintained in a controllable and stable level in the overlap region, the non-overlap region only needs to consider the internal interference; in this way, the cells in the target group domain in the non-overlap region can effectively control the interference by only using the dedicated spectrum and the loanable spectrum.

DETAILED DESCRIPTION

The technical solution of the disclosure will be further described in details below in combination with the accompanying drawings and embodiments.

Figure 1:
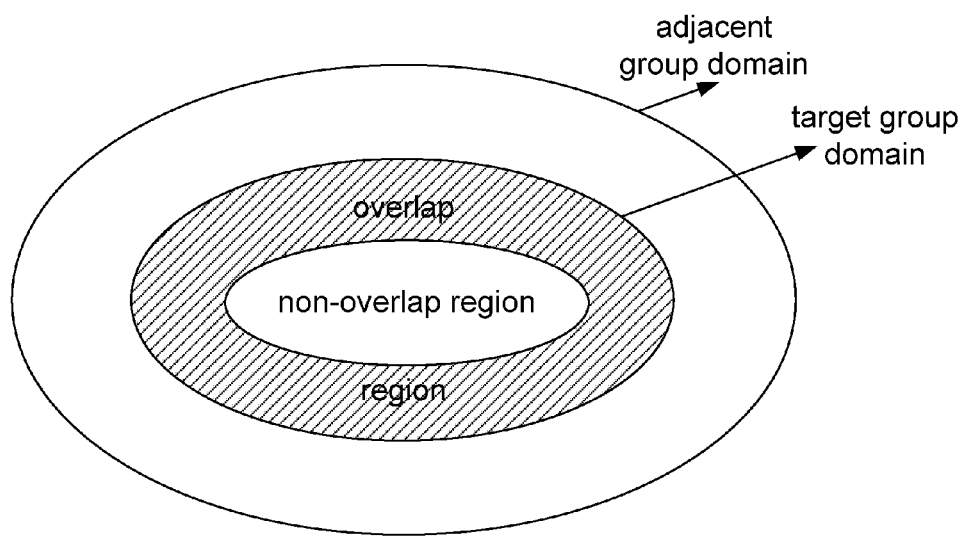
FIG. 1 is a schematic diagram of an overlap region and a non-overlap region.
Figure 2:
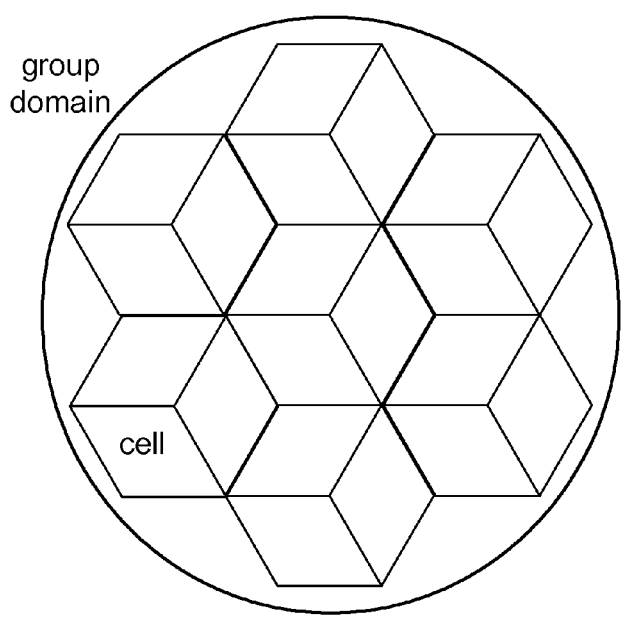
FIG. 2 is a schematic diagram illustrating a relationship between a group domain and a cell.

The spectrum allocation proposal of the disclosure is to perform spectrum allocation during system reconfiguration. More specifically, spectrums are allocated to cells of a target group domain in an overlap region first, and spectrums are then allocated to cells of a target group domain in a non-overlap region. When the spectrum allocation is performed, according to the interference suppression effect of different types of spectrums, the following types of spectrums can be allocated: dedicated spectrums, reusable spectrums and loanable spectrums, wherein the overlap region refers to a portion of the target group domain, which is overlapped with an adjacent group domain thereof, as shown in FIG. 1;

the non-overlap region refers to a portion of the target group domain, which is not overlapped with the adjacent group domain thereof, as shown in FIG. 1;

a group domain is formed by triggering a reconfiguration event and may include a physical region formed by one or more working cells; the parameters of a wireless communication system serving the physical region may be reconfigurable or not reconfigurable; FIG. 2 shows a schematic diagram illustrating a relationship between a group domain and a cell;

the target group domain refers to a group domain expected to be reconfigured due to one or more reasons including load change, resource optimization, performance optimization and new RAT establishment;

the adjacent group domain refers to a group domain which is adjacent to or overlapped with the target group domain, and whose all or part of the useable resources can be shared with the target group domain. The resources include: time domain resources, and/or frequency domain resources, and/or code domain resources, and/or spatial domain resources;

the dedicated spectrums refer to a spectrum set which can be used by the target group domain and cannot be used by the adjacent group domain;

the loanable spectrums refer to a spectrum set in shared spectrums of the adjacent group domain, which can be loaned to the target group domain for the use on the premise of satisfying the expected quality of service;

unloanable spectrums refer to a spectrum set in the shared spectrums besides the loanable spectrums, wherein the shared spectrums refer to the overlapped portion of the useable spectrums of the target group domain and the useable spectrums of the adjacent group domain; the useable spectrums refer to a frequency set in which all RATs supported by group domains can work;

the reusable spectrums can be used by the cells of the target group domain in the overlap region and ensure that the cells of the adjacent group domain in the overlap region are not interfered, and belong to the unloanable spectrum set.

Figure 3:
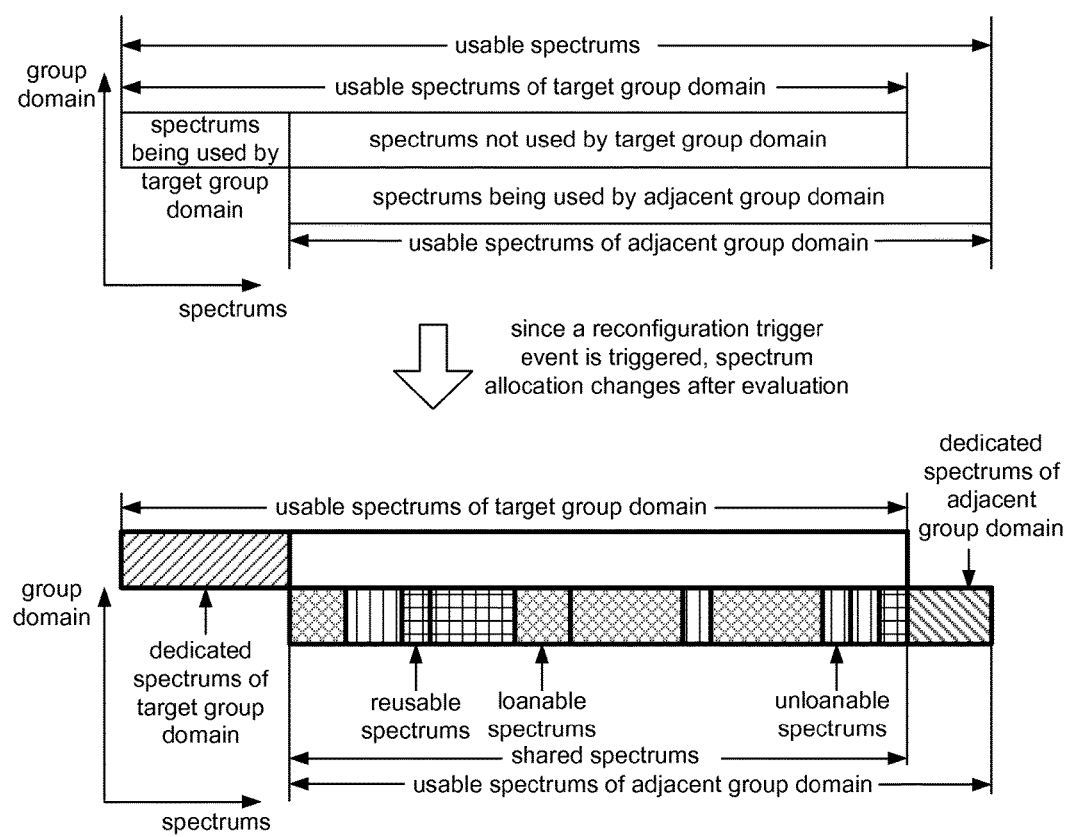
FIG. 3 is a schematic diagram illustrating spectrum allocation before and after system reconfiguration.

FIG. 3 shows a schematic diagram illustrating spectrum allocation before and after system reconfiguration.

Figure 4:
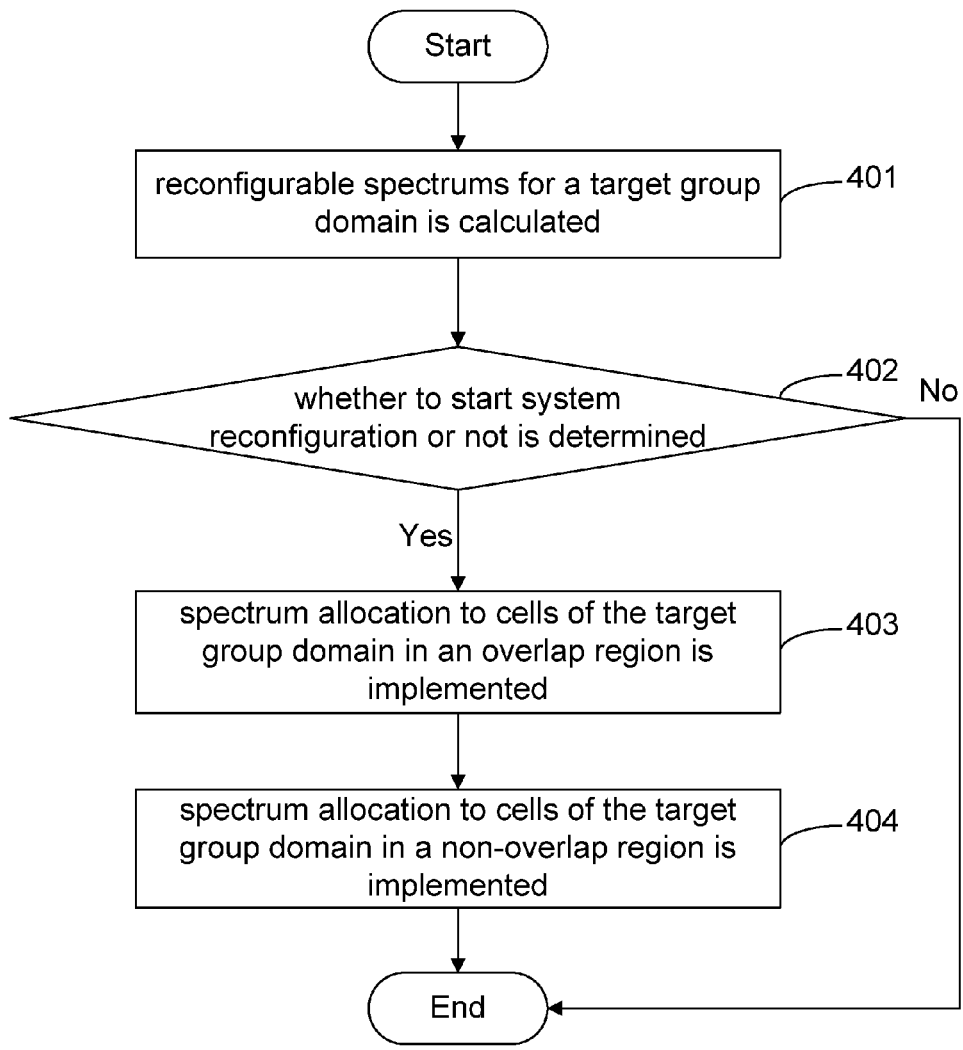
FIG. 4 is a flowchart of spectrum allocation of the disclosure.

FIG. 4 shows a flowchart of spectrum allocation during system reconfiguration in an embodiment of the disclosure, including the following steps.

Step 401: reconfigurable spectrums for a target group domain are calculated.

More specifically, the reconfigurable spectrums for the target group domain are calculated by a reconfigurable wireless communication system of the target group domain.

The reconfigurable spectrums include one or more of dedicated spectrums, reusable spectrums and loanable spectrums. Theoretically, interference will not be brought to the cells of the adjacent group domain when the cells of the target group domain use these three kinds of spectrums.

More specifically, the step of calculating the reconfigurable spectrums for the target group domain includes: calculating to obtain the occupation situation of all spectrums or part of the expected spectrums in the adjacent group domain, and obtaining the reconfigurable spectrums of the target group domain according to the calculation, wherein there are three methods for calculating to obtain the occupation situation of all spectrums or part of the expected spectrums of the adjacent group domain:

the first method is interaction: a base station or a high-level device of the adjacent group domain notifies the occupation situation of all spectrums or part of the expected spectrums of the adjacent group domain to the reconfigurable wireless communication system of the target group domain through a notification message;

the second method is measurement: a base station and/or a terminal of the target group domain performs measurement to obtain the occupation situation of all spectrums or part of the expected spectrums of the adjacent group domain and reports the occupation situation to the reconfigurable wireless communication system of the target group domain;

the third method is that the reconfigurable wireless communication system of the target group domain obtains the occupation situation of all spectrums or part of the expected spectrums of the adjacent group domain by using the first method and the second method at the same time.

Here, the reconfigurable wireless communication system of the target group domain obtains the occupation situation of all spectrums or part of the expected spectrums of the adjacent group domain by interaction and/or measurement, i.e. the spectrum occupation situation of the base station and the terminal of the adjacent group domain, including: the useable spectrums of the adjacent group domain, and/or the unloanable spectrums of the adjacent group domain, and then computes to obtain the reconfigurable spectrums for the target group domain, the process specifically includes:

the usable spectrums of the target group domain are compared with the usable spectrums of the adjacent group domain through interaction and/or measurement to obtain the dedicated spectrums and the shared spectrums of the target group domain;

the unloanable spectrums of the adjacent group domain are deducted from the obtained shared spectrums of the target group domain through interaction and/or measurement to obtain the loanable spectrums of the target group domain;

in the unloanable spectrums of the adjacent group domain, which are obtained through interaction and/or measurement, the spectrums which can be used by the cells of the target group domain in the overlap region and cause no interference to the cells of the adjacent group domain in the overlap region are the reusable spectrums of the target group domain (the spectrums can be only used by the cells of the target group domain in the overlap domain).

The dedicated spectrums, the reusable spectrums and the loanable spectrums of the target group domain are obtained thereby.

Step 402: whether or not system reconfiguration needs to be initiated is determined, if it needs to be initiated, Step 403 is executed, otherwise, the process is ended.

More specifically, the reconfigurable wireless communication system of the target group domain determines whether the current spectrum configuration of the target group domain satisfies the current quality of service of the target group domain, e.g. whether the current spectrum configuration satisfies the current service volume. Of course, besides the service volume, parameters that are used to measure the quality of service further include the user bandwidth demands, and etc.

Step 403: the spectrum allocation is performed on the cells of the target group domain in the overlap region.

The spectrum allocation is performed by the reconfigurable wireless communication system of the target group domain. During the system reconfiguration, spectrums are allocated to the cells of the target group domain in the overlap region first, specifically: when any one or more of the dedicated spectrums, the reusable spectrums and the loanable spectrums satisfy the expected quality of service of the overlap region, the spectrums which satisfy the expected quality of service of the overlap region are allocated to the cells of the target group domain in the overlap region; otherwise, the spectrum allocation is ended.

A preferred embodiment is described as follows: during the spectrum allocation, the dedicated spectrums are considered first, then the reusable spectrums and finally the loanable spectrums, i.e. the allocation is performed for the dedicated spectrums, the reusable spectrums and the loanable spectrums in order from highest priority to lowest priority (according to actual demands, the spectrum allocation sequence is not limited to what is described here), specifically:

(1) when the reconfigurable spectrums include the dedicated spectrums, the reusable spectrums and the loanable spectrums:

whether the dedicated spectrums can satisfy the expected quality of service of the overlap region is determined first, if they can satisfy the expected quality of service, the spectrum allocation is ended after allocating the dedicated spectrums; otherwise, whether the dedicated spectrums and the reusable spectrums can satisfy the expected quality of service of the overlap region is determined, if the two types of spectrums can satisfy the expected quality of service, the spectrum allocation is ended after allocating the dedicated spectrums and the reusable spectrums; otherwise, whether the dedicated spectrums, the reusable spectrums and the loanable spectrums can satisfy the expected quality of service of the overlap region is determined, if the three types of spectrums can satisfy the expected quality of service, the spectrum allocation is ended after allocating the dedicated spectrums, the reusable spectrums and the loanable spectrums; otherwise, the spectrum allocation is ended directly.

(2) when the reconfigurable spectrums only include the dedicated spectrums and the reusable spectrums:

whether the dedicated spectrums can satisfy the expected quality of service of the overlap region is determined first, if the dedicated spectrums can satisfy the expected quality of service, the spectrum allocation is ended after allocating the dedicated spectrums; otherwise, whether the dedicated spectrums and the reusable spectrums can satisfy the expected quality of service of the overlap region is determined, if the two types of spectrums can satisfy the expected quality of service, the spectrum allocation is ended after allocating the dedicated spectrums and the reusable spectrums; otherwise, the spectrum allocation is ended directly.

(3) when the reconfigurable spectrums only include the dedicated spectrums and the loanable spectrums:

whether the dedicated spectrums can satisfy the expected quality of service of the overlap region is determined first, if the dedicated spectrums can satisfy the expected quality, the spectrum allocation is ended after allocating the dedicated spectrums; otherwise, whether the dedicated spectrums and the loanable spectrums can satisfy the expected quality of service of the overlap region is determined, if the two types of spectrums can satisfy the expected quality of service, the spectrum allocation is ended after allocating the dedicated spectrums and the loanable spectrums; otherwise, the spectrum allocation is ended directly.

(4) when the reconfigurable spectrums only include the reusable spectrums and the loanable spectrums:

whether the reusable spectrums can satisfy the expected quality of service of the overlap region is determined first, if the reusable spectrums can satisfy the expected quality of service, the spectrum allocation is ended after allocating the reusable spectrums; otherwise, whether the reusable spectrums and the loanable spectrums can satisfy the expected quality of service of the overlap region is determined, if the two types of spectrums can satisfy the expected quality of service, the spectrum allocation is ended after allocating the reusable spectrums and the loanable spectrums; otherwise, the spectrum allocation is ended directly.

(5) when the reconfigurable spectrums only include the dedicated spectrums, or the reusable spectrums or the loanable spectrums:

whether the dedicated spectrums, or the reusable spectrums or the loanable spectrums can satisfy the expected quality of service of the overlap region is determined, if the dedicated spectrums, or the reusable spectrums or the loanable spectrums can satisfy the expected quality of service, the spectrum allocation is ended after allocating the dedicated spectrums, or the reusable spectrums or the loanable spectrums; otherwise, the spectrum allocation is ended directly.

Step 404: spectrum allocation to cells of the target group domain in the non-overlap region is performed.

The spectrum allocation is performed by the reconfigurable wireless communication system of the target group domain. During the system reconfiguration, spectrums are allocated to the cells of the target group domain in the non-overlap region.

Specifically, after the spectrums are allocated to the cells of the target group domain in the overlap region, spectrum allocation may be performed on the cells of the target group domain in the non-overlap region by using the spectrum resources remaining in the reconfigurable spectrums. It should be noted that, the remaining spectrum resources described herein refer to the dedicated spectrums and the loanable spectrums. The reusable spectrums used for spectrum allocation to the cells of the target group domain in the non-overlap region are determined in the following way: besides the reusable spectrums allocated to the cells of the target group domain in the overlap region, the remaining spectrums in the unloanable spectrums of the target group domain are the reusable spectrums allocated to the cells of the target group domain in the non-overlap region.

Therefore, before allocating the spectrums to the cells of the target group domain in the non-overlap region, the reconfigurable spectrums need to be determined first, including one or more of the remaining dedicated spectrums, the remaining loanable spectrums and the reusable spectrums used for spectrum allocation to the cells of the target group domain in the non-overlap region. The spectrum allocation specifically includes: when any one or more of the remaining dedicated spectrums, the remaining loanable spectrums and the useable spectrums used for spectrum allocation to the cells of the target group domain in the non-overlap region satisfy the expected quality of service of the target group domain, the spectrums which satisfy the expected quality of service of the overlap region are allocated to the cells of the target group domain in the non-overlap region; otherwise, the spectrum allocation is ended.

A preferred embodiment is described as follows: during the spectrum allocation, the dedicated spectrums are considered first, then the loanable spectrums and finally the reusable spectrums, i.e. the allocation is performed for the dedicated spectrums, the loanable spectrums and the reusable spectrums in order from highest priority to lowest priority (according to actual demands, the spectrum allocation sequence is not limited to what is described here), specifically:

(1) when the reconfigurable spectrums include the dedicated spectrums, the loanable spectrums and the reusable spectrums:

whether the dedicated spectrums can satisfy the expected quality of service of the target group domain is determined first, if the dedicated spectrums can satisfy the expected quality of service, the spectrum allocation is ended after allocating the dedicated spectrums; otherwise, whether the dedicated spectrums and the loanable spectrums can satisfy the expected quality of service of the target group domain is determined, if the two types of spectrums can satisfy the expected quality of service, the spectrum allocation is ended after allocating the dedicated spectrums and the loanable spectrums; otherwise, whether the dedicated spectrums, the loanable spectrums and the reusable spectrums can satisfy the expected quality of service of the target group domain is determined, if the three types of spectrums can satisfy the expected quality of service, the spectrum allocation is ended after allocating the dedicated spectrums, the loanable spectrums and the reusable spectrums; otherwise, the spectrum allocation is ended directly.

(2) when the reconfigurable spectrums only include the dedicated spectrums and the loanable spectrums:

whether the dedicated spectrums can satisfy the expected quality of service of the target group domain is determined first, if the dedicated spectrums can satisfy the expected quality of service, the spectrum allocation is ended after allocating the dedicated spectrums; otherwise, whether the dedicated spectrums and the loanable spectrums can satisfy the expected quality of service of the target group domain is determined, if the two types of spectrums can satisfy the expected quality of service, the spectrum allocation is ended after allocating the dedicated spectrums and the loanable spectrums; otherwise, the spectrum allocation is ended directly.

(3) when the reconfigurable spectrums only include the dedicated spectrums and the reusable spectrums:

whether the dedicated spectrums can satisfy the expected quality of service of the target group domain is determined first, if the dedicated spectrums can satisfy the expected quality of service, the spectrum allocation is ended after allocating the dedicated spectrums; otherwise, whether the dedicated spectrums and the reusable spectrums can satisfy the expected quality of service of the target group domain is determined, if the two types of spectrums can satisfy the expected quality of service, the spectrum allocation is ended after allocating the dedicated spectrums and the reusable spectrums; otherwise, the spectrum allocation is ended directly.

(4) when the reconfigurable spectrums only include the loanable spectrums and the reusable spectrums:

whether the loanable spectrums can satisfy the expected quality of service of the target group domain is determined first, if the loanable spectrums can satisfy the expected quality of service, the spectrum allocation is ended after allocating the loanable spectrums; otherwise, whether the loanable spectrums and the reusable spectrums can satisfy the expected quality of service of the target group domain is determined, if the two types of spectrums can satisfy the expected quality of service, the spectrum allocation is ended after allocating the loanable spectrums and the reusable spectrums; otherwise, the spectrum allocation is ended directly.

(5) when the reconfigurable spectrums only include the dedicated spectrums, or the loanable spectrums or the reusable spectrums:

whether the dedicated spectrums, or the loanable spectrums or the reusable spectrums can satisfy the expected quality of service of the target group domain is determined, if the dedicated spectrums, or the loanable spectrums or the reusable spectrums can satisfy the expected quality of service, the spectrum allocation is ended after allocating the dedicated spectrums, or the loanable spectrums or the reusable spectrums; otherwise, the spectrum allocation is ended directly.

Figure 5:
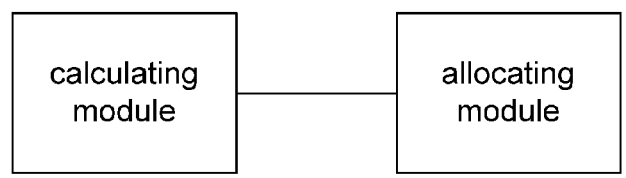
FIG. 5 is a structural diagram of an apparatus for allocating a spectrum of the disclosure.

To realize the method for allocating spectrum above, the disclosure provides an apparatus for allocating spectrums. As shown in FIG. 5, the apparatus includes:

a calculating module configured to calculate reconfigurable spectrums for a target group domain, including one or more of dedicated spectrums, reusable spectrums and loanable spectrums;

an allocating module configured to, during system reconfiguration, allocate spectrums to cells of the target group domain in a non-overlap region after spectrums are allocated to cells of the target group domain in an overlap region according to the reconfigurable spectrums;

wherein the calculating module is further configured to, after allocating the spectrums to the cells of the target group domain in the overlap domain, determine the dedicated spectrums and/or the loanable spectrums remaining in the reconfigurable spectrums except the spectrums allocated to the cells of the target group domain in the overlap region; and after deducting the reusable spectrums allocated to the cells of the target group domain in the overlap region from the unloanable spectrums of the target group domain, obtain the reusable spectrums used for spectrum allocation to the cells of the target group domain in the non-overlap region.

Correspondingly, when the calculating module allocates the spectrums to the cells of the target group domain in the non-overlap region, the reconfigurable spectrums include one or more of the remaining dedicated spectrums, the remaining loanable spectrums and the reusable spectrums used for spectrum allocation to the cells of the target group domain in the non-overlap region.

The above are only the preferred embodiments of the disclosure and not intended to limit the scope of protection of the disclosure.

The invention claimed is:

1. A method for allocating spectrums, comprising:

calculating, by a reconfigurable wireless communication system of a target group domain, reconfigurable spectrums for the target group domain, wherein the reconfigurable spectrums comprise one or more of dedicated spectrums, reusable spectrums and loanable spectrums; and during system reconfiguration, allocating, by the reconfigurable wireless communication system, spectrums to cells of the target group domain in a non-overlap region after allocating spectrums by the reconfigurable wireless communication system to cells of the target group domain in an overlap region according to the reconfigurable spectrums;

wherein calculating, by the reconfigurable wireless communication system of a target group domain, the reconfigurable spectrums for the target group domain comprises:

calculating to obtain an occupation situation of all spectrums or part of expected spectrums in an adjacent group domain, comprising: at least one of usable spectrums of the adjacent group domain and unloanable spectrums of the adjacent group domain; and computing to obtain the reconfigurable spectrums for the target group domain according to the occupation situation of all spectrums or part of the expected spectrums of the adjacent group domain;

wherein calculating, by the reconfigurable wireless communication system of a target group domain, to obtain the occupation situation of all spectrums or part of expected spectrums of the adjacent group domain comprises at least one of following steps of:

notifying, by a base station or a high-level device of the adjacent group domain, the occupation situation of all spectrums or part of the expected spectrums of the adjacent group domain to a reconfigurable wireless communication system of the target group domain through a notification message; and, performing measurement, by at least one of a base station and a terminal of the target group domain to obtain the occupation situation of all spectrums or part of the expected spectrums of the adjacent group domain, and then reporting the occupation situation to the reconfigurable wireless communication system of the target group domain;

wherein computing, by the reconfigurable wireless communication system of a target group domain, to obtain the reconfigurable spectrums for the target group domain comprises:

comparing usable spectrums of the target group domain with the usable spectrums of the adjacent group domain to obtain dedicated spectrums and shared spectrums of the target group domain;

deducting the unloanable spectrums of the adjacent group domain from the obtained shared spectrums of the target group domain to obtain the loanable spectrums of the target group domain; and in the unloanable spectrums of the adjacent group domain, using spectrums which can be used by the cells of the target group domain in the overlap region and causes no interference to cells of the adjacent group domain in the overlap region as the reusable spectrums of the target group domain;

when allocating by the reconfigurable wireless communication system spectrums to cells of the target group domain in a non-overlap region, the allocation is performed for the dedicated spectrums, the loanable spectrums and the reusable spectrums in order from highest priority to lowest priority.

2. The method for allocating spectrums according to claim 1, wherein the allocating spectrums by the reconfigurable wireless communication system to cells of the target group domain in an overlap region comprises:
when any one or more of the dedicated spectrum, the reusable spectrum and the loanable spectrum satisfy expected quality of service of the overlap region, allocating, by the reconfigurable wireless communication system, spectrums which satisfy the expected quality of service of the overlap region to the cells of the target group domain in the overlap region; otherwise, ending, by the reconfigurable wireless communication system, the spectrum allocation.

3. The method for allocating spectrums according to claim 2, further comprising: after allocating the spectrums by the reconfigurable wireless communication system to the cells of the target group domain in the overlap domain,
determining, by the reconfigurable wireless communication system, at least one of dedicated spectrums and loanable spectrums remaining in the reconfigurable spectrums after the spectrums are deducted from the reconfigurable spectrums to be allocated to the cells of the target group domain in the overlap region; and
obtaining, by the reconfigurable wireless communication system, reusable spectrums used for spectrum allocation to the cells of the target group domain in the non-overlap region after deducting reusable spectrums allocated to the cells of the target group domain in the overlap region from the unloanable spectrums of the target group domain.

4. The method for allocating spectrums according to claim 3, wherein when the spectrum allocation to the cells of the target group domain in the non-overlap region is performed, the reconfigurable spectrums comprise one or more of the remaining dedicated spectrums, the remaining loanable spectrums and the reusable spectrums used for the spectrum allocation to the cells of the target group domain in the non-overlap region.

5. The method for allocating spectrums according to claim 4, wherein the spectrum allocation to the cells of the target group domain in the non-overlap region comprises:
when any one or more of the remaining dedicated spectrums, the remaining loanable spectrums and the reusable spectrums used for the spectrum allocation to the cells of the target group domain in the non-overlap region satisfy expected quality of service of the target group domain, allocating, by the reconfigurable wireless communication system, spectrums which satisfy the expected quality of service of the overlap region to the cells of the target group domain in the non-overlap region; otherwise, ending, by the reconfigurable wireless communication system, the spectrum allocation.

6. An apparatus for allocating spectrums, comprising a processor and a memory storing program instructions, which, when executed by the processor, cause the processor to perform steps comprising:
calculating reconfigurable spectrums for a target group domain, wherein the reconfigurable spectrums comprise one or more of dedicated spectrums, reusable spectrums and loanable spectrums; and
during system reconfiguration, allocating spectrums to cells of the target group domain in a non-overlap region after allocating spectrums to cells of the target group domain in an overlap region according to the reconfigurable spectrums;
wherein the processor is arranged in a reconfigurable wireless communication system of the target group domain;
wherein the processor is further configured to be capable of executing the stored program instructions to calculate to obtain an occupation situation of all spectrums or part of expected spectrums in an adjacent group domain, comprising: at least one of usable spectrums of the adjacent group domain and unloanable spectrums of the adjacent group domain; and further to compute to obtain the reconfigurable spectrums for the target group domain according to the occupation situation of all spectrums or part of the expected spectrums of the adjacent group domain;
wherein when calculating to obtain the occupation situation of all spectrums or part of expected spectrums of the adjacent group domain, the processor is further configured to be capable of executing the stored program instructions to perform at least one of operations of:
receiving, from a base station or a high-level device of the adjacent group domain, the occupation situation of all spectrums or part of the expected spectrums of the adjacent group domain through a notification message; and,
receiving, from at least one of a base station and a terminal of the target group domain, the occupation situation of all spectrums or part of the expected spectrums of the adjacent group domain after at least one of the base station and the terminal of the target group domain obtains the occupation situation by measurement;
wherein when computing to obtain the reconfigurable spectrums for the target group domain, the processor is further configured to be capable of executing the stored program instructions to:
compare usable spectrums of the target group domain with the usable spectrums of the adjacent group domain to obtain dedicated spectrums and shared spectrums of the target group domain;
deduct the unloanable spectrums of the adjacent group domain from the obtained shared spectrums of the target group domain to obtain the loanable spectrums of the target group domain; and
in the unloanable spectrums of the adjacent group domain, use spectrums which can be used by the cells of the target group domain in the overlap region and causes no interference to cells of the adjacent group domain in the overlap region as the reusable spectrums of the target group domain;
when allocating spectrums to cells of the target group domain in a non-overlap region, the allocation is performed for the dedicated spectrums, the loanable spectrums and the reusable spectrums in order from highest priority to lowest priority.

7. The apparatus for allocating spectrums according to claim 6, wherein
the processor is further configured to be capable of executing the stored program instructions to, after allocating spectrums to the cells of the target group domain in the overlap domain, determine at least one of dedicated spectrums and loanable spectrums remaining in the reconfigurable spectrums except the spectrums allocated to the cell of the target group domain in the overlap region; and after deducting reusable spectrums allocated to the cells of the target group domain in the overlap region from unloanable spectrums of the target group domain, obtain reusable spectrums used for spectrum allocation to the cells of the target group domain in the non-overlap region;

correspondingly, when allocating the spectrums to the cells of the target group domain in the non-overlap region, the reconfigurable spectrum comprises one or more of the remaining dedicated spectrums, the remaining loanable spectrums and the reusable spectrums used for the spectrum allocation to the cells of the target group domain in the non-overlap region.

8. The method for allocating spectrums according to claim 1, wherein when allocating spectrums by the reconfigurable wireless communication system to cells of the target group domain in an overlap region, the allocation is performed for the dedicated spectrums, the reusable spectrums and the loanable spectrums in order from highest priority to lowest priority.

9. The apparatus for allocating spectrums according to claim 6, wherein when allocating spectrums to cells of the target group domain in an overlap region, the allocation is performed for the dedicated spectrums, the reusable spectrums and the loanable spectrums in order from highest priority to lowest priority.

* * * * *